Nov. 15, 1938.   A. VUILLEUMIER   2,136,831
SHEARING MECHANISM AND METHOD
Filed Sept. 15, 1936   5 Sheets-Sheet 2

INVENTOR:
ALBERT VUILLEUMIER,
BY Gales P. Moore
HIS ATTORNEY.

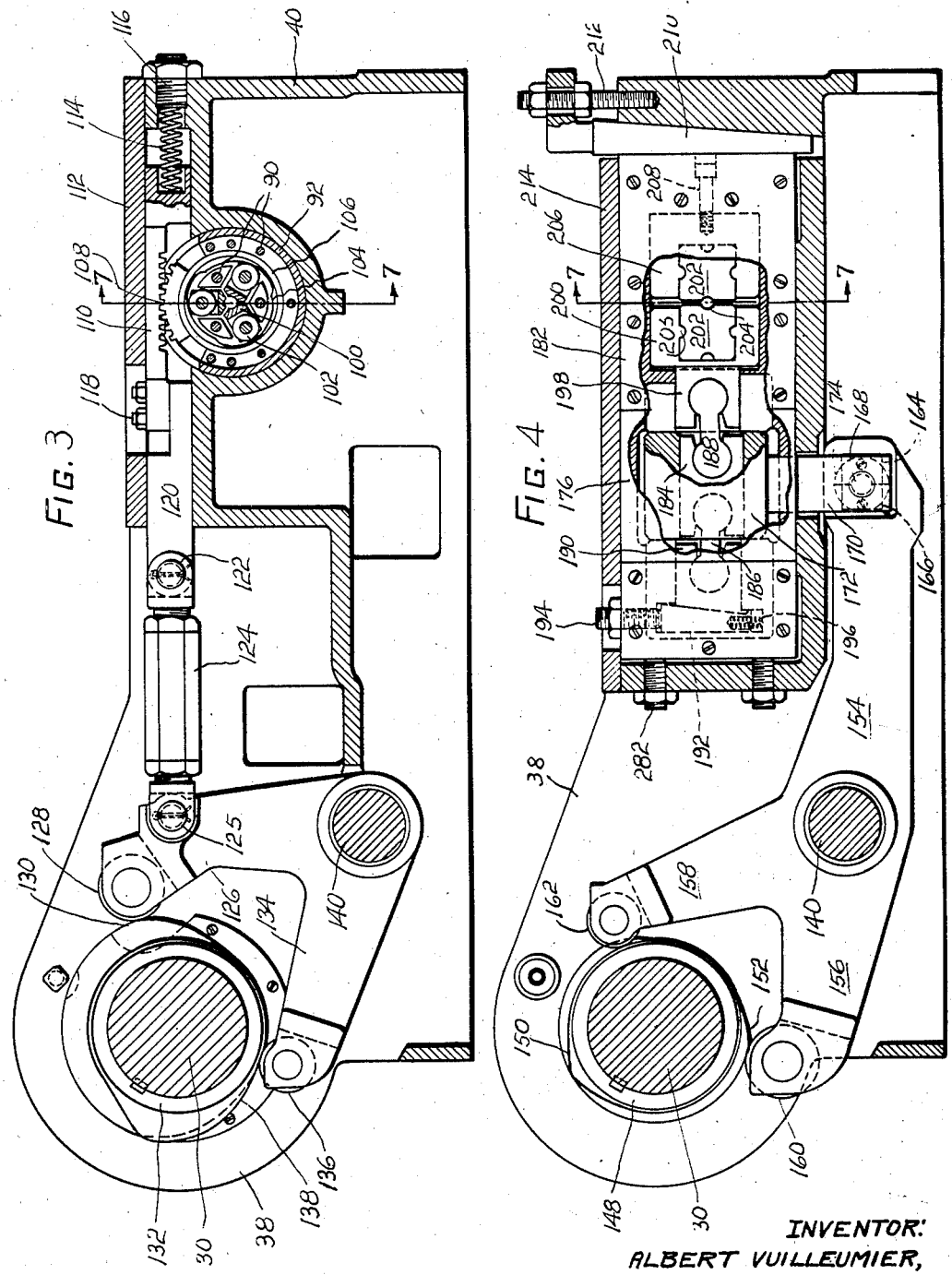

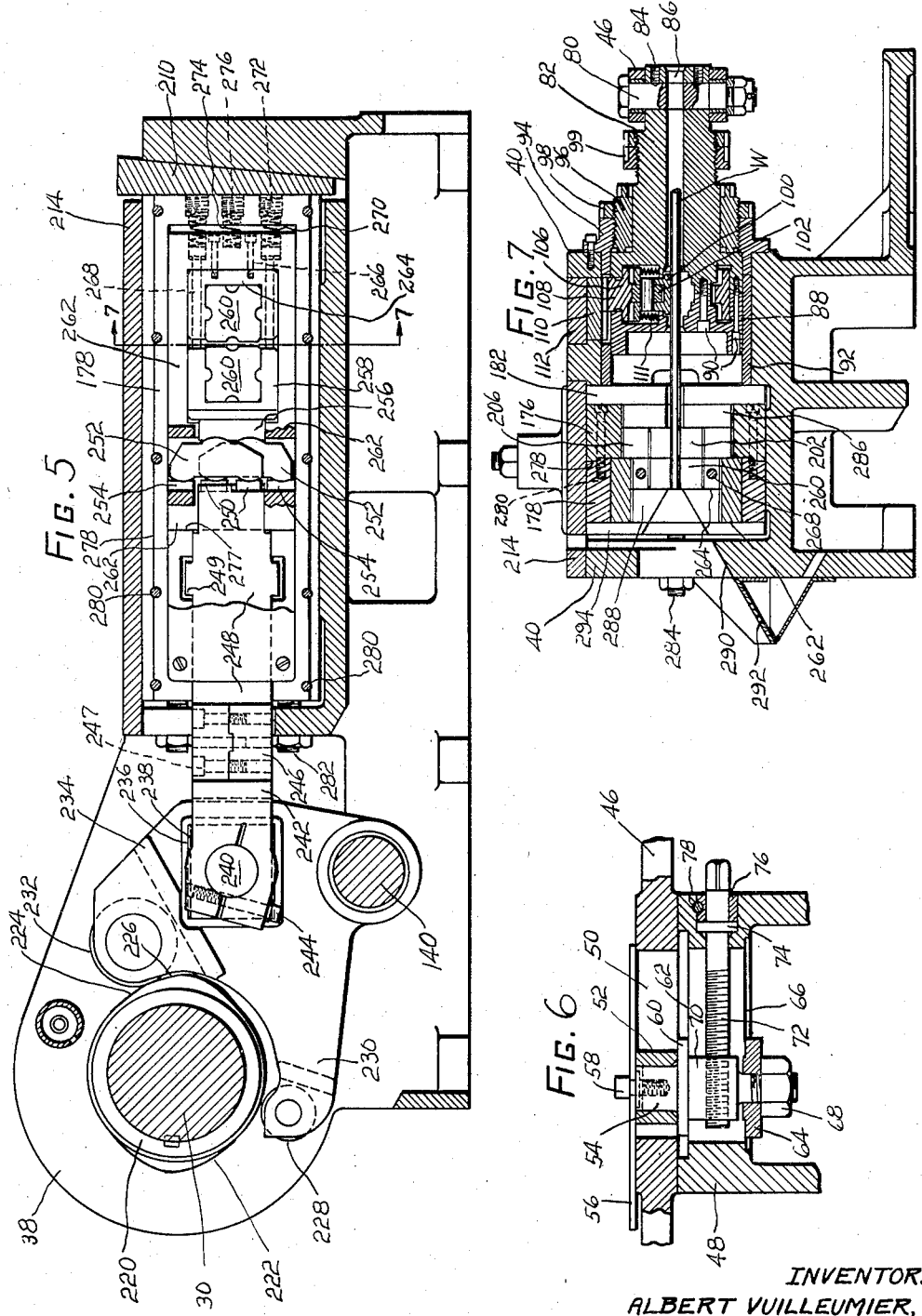

Nov. 15, 1938.                A. VUILLEUMIER                2,136,831
                    SHEARING MECHANISM AND METHOD
                    Filed Sept. 15, 1936          5 Sheets-Sheet 5
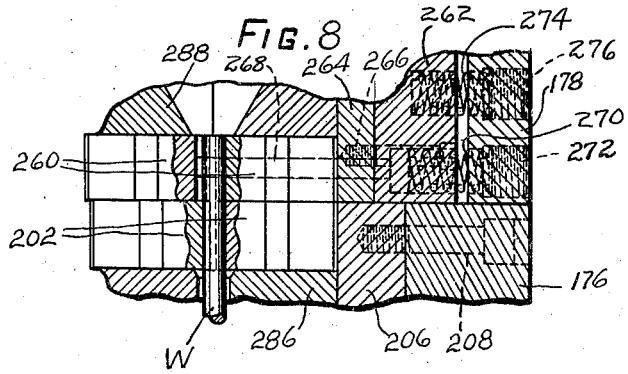
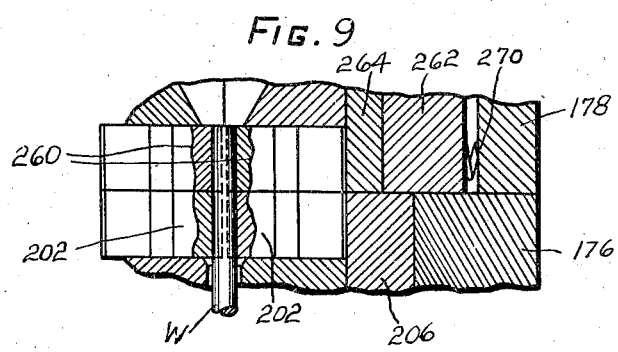
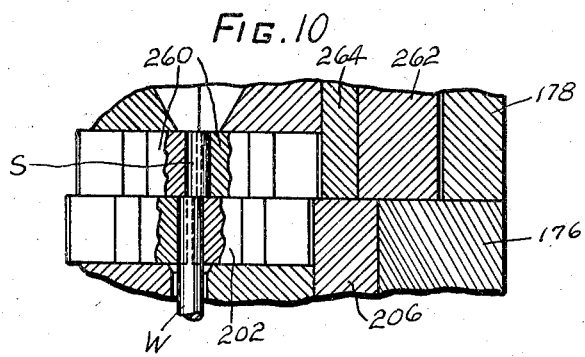
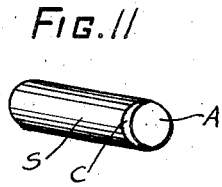
INVENTOR:
ALBERT VUILLEUMIER,
BY Gales P. Moore
HIS ATTORNEY.

Patented Nov. 15, 1938

2,136,831

UNITED STATES PATENT OFFICE 2,136,831

SHEARING MECHANISM AND METHOD

Albert Vuilleumier, Bristol, Conn., assignor to General Motors Corporation, Detroit, Mich., a corporation of Delaware Application September 15, 1936, Serial No. 100,906

30 Claims. (Cl. 140—130)

This invention relates to shearing mechanisms and methods, more especially for producing slugs or short lengths of wire or the like which are to be headed or upset into balls. According to prior practice in heading balls, a strip of wire is fed through a hole in a frame part which surrounds the wire without clamping it, the end of the wire projecting from the hole and abutting against a stop. This projecting end of the wire is then sheared off by a cut-off slide having a half die to engage one side of the wire and carry it between heading dies. Balls produced from such heading machines have considerable curl in the fibers at the polar area and it is expensive to remove this curl by grinding. I have discovered that the objectionable curl is due to the fact that the slugs are not cut off square but are sheared on an angle so that the heading dies tend to turn or fold over the fibers.

An object of the invention accordingly is to produce slugs which will avoid the above and other difficulties. Another object is to provide improved mechanism for producing slugs which are substantially flat at the ends and square with the axis so that the resulting structure is uniform. Another object is to provide an improved method of making slugs from a strip of material. Another object is to provide an efficient machine for shearing strip material into a series of slugs or short lengths having end faces square with the axis. In general these objects are attained by tightly gripping between dies a length of the strip material at a location removed from the end, tightly clamping the projecting end portion between a pair of opposed shearing dies which are close alongside of the gripping dies, and then suddenly and quickly shifting the shearing dies a short distance transversely of the strip so that the slug is produced by a combined shearing and fracturing without the fibers having a chance to bend.

To these ends and also to improve generally upon machines and methods of this character, the invention consists in the various matters hereinafter described and claimed. In its broader aspects, the invention is not necessarily limited to the specific construction and steps selected for illustrative purposes in the accompanying drawings in which Fig. 1 is a side elevation of the machine.

Fig. 3 is a vertical sectional view on the line 3—3 of Fig. 2.

Fig. 4 is a vertical sectional view on the line 4—4 of Fig. 2 with parts broken away.

Fig. 5 is a vertical sectional view on the line 5—5 of Fig. 2 with parts broken away.

Fig. 6 is a vertical sectional view on the line 6—6 of Fig. 2.

Fig. 7 is a vertical sectional view on the line 7—7 of Fig. 5.

Fig. 8 is a horizontal sectional view of the dies and associated mechanism in an initial position.

Fig. 9 is a view similar to Fig. 8 with the dies in a position ready to shear.

Fig. 10 is a view similar to Fig. 9 with the dies in the final position.

Fig. 11 is a perspective view of the sheared-off slug.

Figure 1:
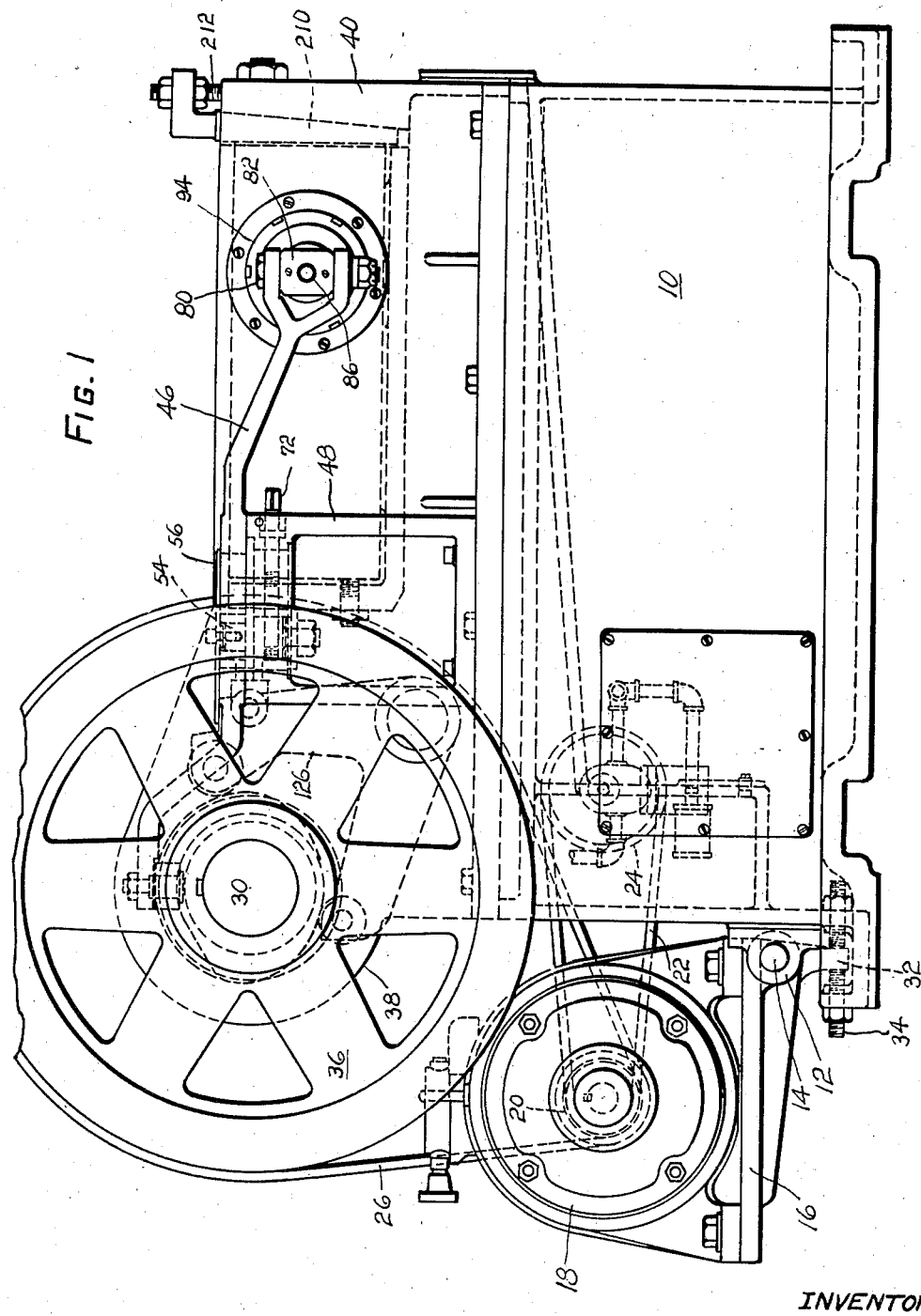

The numeral 10 indicates a base having lugs 12 at one end to support a pivot shaft 14 for a platform 16 carrying a motor 18. The motor has a driving pulley 20 for a belt 22 which drives a pulley 24 connected to a pump which supplies lubricating fluid to the machine. The motor pulley also drives belts 26 which rotate a pulley 28 on a cam shaft 30 which has a series of cams to control the machine. To keep the belts in proper tension, the platform 16 is angularly adjustable by means of a lug 32 interposed between adjusting screws 34 on the frame. A balance wheel 36 is mounted on the cam shaft on the end opposite to the pulley 28, the cam shaft being journalled in lugs or ribs 38 projecting from an elevated sub-frame 40.

Figure 2:
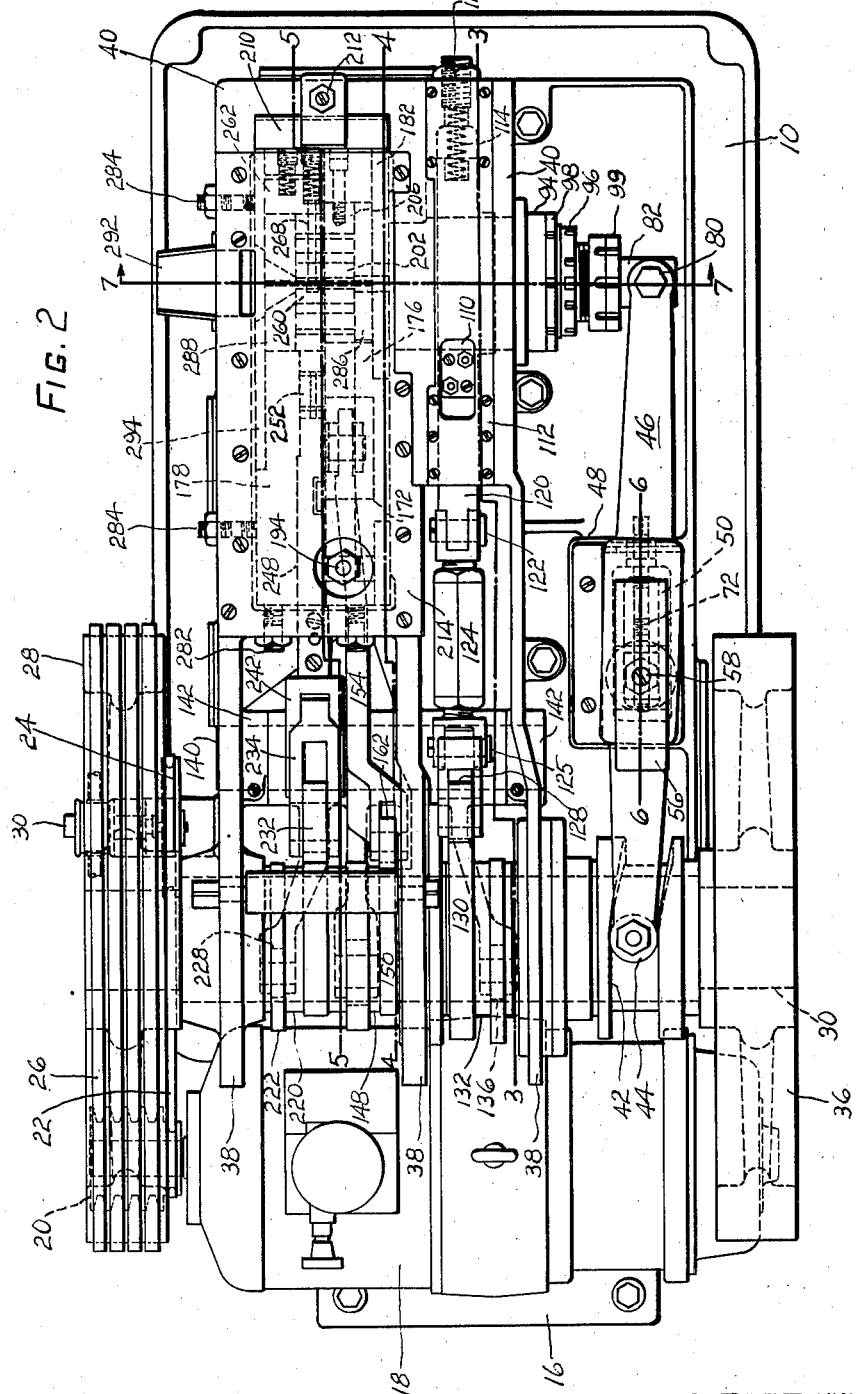
Fig. 2 is a plan view.

On the cam shaft 30 is keyed a series of cams which control the feeding of the material, the gripping of the material, and the shearing of the material, all in proper sequence. A feed cam 42 (Fig. 2) of drum type co-operates with a cam roller 44 in a fork of a feed lever 46 which is mounted with an adjustable pivot on a standard 48. As shown best in Fig. 6, the feed lever has a slot 50 for a square block 52 into which projects a round pivot stud 54, a cover plate 56 closing the slot and being secured to the stud by a screw 58. The stud has a collar 60 adapted to clamp against side rails 62 of the standard when a washer 64 is set up against bottom side rails 66 by a nut 68. In the slot between the side rails, the stud has a nut or block 70 which is tapped to receive an adjusting screw 72 by which the position of the pivot stud 54 is adjusted in the slot 50 of the feed lever when the clamping washer 64 is loosened. The screw is held from endwise movement by a collar 74 which lies between a seat in the standard and a bearing sleeve 76 which is locked to the standard by a pin 78. The adjustment of the pivot stud is to control the extent of the feed stroke of feed lever 46 so that a desired length of material can be advanced for shearing.

Feed lever 46 has its longer arm pivotally connected (see Fig. 7) by a pivot bolt 80 to a shiftable head 82 which slides axially to feed the wire W or other material to be treated. The bolt 80 is secured against rotation in the head by screws 84 and has a hole to register with a hole 86 in the head through which the wire is advanced to the left. The head has a detachable inner section 88 secured by screws 90. The head is slidable axially to a limited extent in a bearing sleeve 92 (Figs. 3 and 7) and in a mating holding ring 94 which is bolted to the sub-frame 40. The ring 94 is internally threaded to receive an adjustable stop sleeve 96 which is locked in position by a nut 98 and engages a shoulder on the head to limit outward movement of the latter. Inward movement of the head is adjustably limited by nuts 99 adapted to engage the stop sleeve 96.

In order to grasp the wire when the head 82 advances or is shifted inwardly on a feed stroke, the head and its inner end section 88 are radially recessed as indicated in Figs. 3 and 7 to receive three radially movable jaws 100, each having a cam roller 102 riding on an internal cam surface 104 of a rotatable sleeve 106 on which is secured a gear segment 108 meshing with a rack 110. Each jaw 100 is urged to releasing position by coil springs 111 (Fig. 7) which engage lugs on the jaw and lugs on the head 82 and its inner end section 88. The rack 110 is wider than the gear segment 108 so that the jaws can be operated in any axial position of the head. The rack is slidable in a recess under a detachable cover plate 112 and is urged in a direction to open the jaws 100 by a coil spring 114 backed up by an adjusting screw 116.

Referring to Fig. 3, for sliding the rack 110 it is detachably connected by taper pins 118 to a sliding bar 120 pivoted by a pin 122 to one end of an adjusting turnbuckle 124, the other end of the turnbuckle being pivoted by a pin 125 to an arm 126. The arm has a fork for a cam roller 128 riding on a cam surface 130 on a cam sleeve 132 which is keyed to the cam shaft 30. A second arm 134 has a cam roller 136 riding on a cam surface 138 of the cam. The arms 134 and 126 are offset one from the other and joined together to oscillate on a pivot shaft 140 which is journalled in bosses 142 carried by the sub-frame 40. It is apparent from the foregoing that rotation of the cam 132 will result in reciprocation of the rack 110 and an opening and closing of the jaws 100. The jaws close on the wire when the head is in the outwardly projecting position shown in Fig. 7 whereupon the head is advanced by its feed lever 46 to feed the wire one step. The wire advances between gripping and shearing dies, as will appear, for the shearing operation after which the jaws 100 open to release the wire and the head returns so the jaws can get a renewal hold on the wire.

The mechanism for gripping the wire for shearing will next be described, this being shown best in Fig. 4. A cam sleeve 148 is keyed to the cam shaft 30 and has a releasing surface 150 and a gripping surface 152 acting to swing a gripping lever 154 which is pivoted on the shaft 140. One arm 156 of the lever carriers a roller 160 engaging the cam surface 152 and another arm 158 carriers a roller 162 engaging the cam surface 150. When the lever swings, it operates a toggle as will appear. The lever 154 has a rectangular slot 164 for a rectangular block 166 having lost motion in the slot to prevent cramping. A pivot stud 168 passes through the block 166 and the arms of a fork 170 which straddles the block, the fork being on the lower end of a vertically slidable block 172. To hold the pivot stud 168, the latter is grooved at the rear end for a split washer 174 fastened by screws to the fork. The block 172 slides in a vertical guiding recess of a long die body 176 which lies alongside of a second die body 178 (Fig. 7), these die bodies being connected together and forming a unitary block with a series of recesses for the various removable dies and their operating means as will appear. The die body 176 has detachable side cover plates 182 for the recesses. In the vertically slidable block 172 is a horizontal recess for a toggle slide 184 which slides horizontally and engages a pair of toggle links 186 and 188, the ends of the links being cylindrical and fitting in similarly shaped recesses. The toggle link 186 engages a toggle block 190 normally held from movement but adjustable horizontally by means of a vertically movable wedge 192 having an adjusting screw 194 opposed to a coil spring 196. The other toggle link 188 engages a toggle block 198 which is slidable horizontally in a recess and forms part of a die holder 200 having a slot for a die 202 opposed to a duplicate but stationary die.

Each die is square and has each side formed centrally with a semi-cylindrical die recess 204 so that all recesses can be used selectively to increase the life of wearing surfaces. The top and bottom recesses fit corresponding lugs 205 on the holder to retain the dies which are inserted laterally in their holders. When the opposed die recesses close over the wire, the flat sides of the opposed dies almost meet. The right hand die is detachably held in a recess of a die holder 206 which is rigidly secured by a screw 208 in a recess of the die body 176. The connected die bodies 176 and 178 abut at one end against a wedge 210 which is adjustable vertically by means of a screw 212 to locate the dies in line with the feeding head 82. A top cover 214 holds the die bodies and is removable to give access to the die bodies and the dies. From the foregoing, it will appear that the cam surfaces 150 and 152 will swing the lever 154 and slide the block 172 vertically. The toggle links 186 and 188 thus straighten out and slide the toggle block 198 and connected die holder 200 horizontally. The left hand gripping die 202 is thus moved towards its mate to grip the wire which is sheared by other dies to be described whereupon the gripping dies 202 release the wire for a further feed step.

Referring to Fig. 5, a cam sleeve 220 is keyed to the cam shaft 30 and has a releasing cam surface 222 and a shearing surface comprising two rises 224 and 226. A cam roller 228 is operated by the cam surface 222 and is carried by an arm 230 pivoted on the shaft 140. A cam roller 232 is operated by the cam surfaces 224 and 226 and is carried by a forked arm 234 connected to arm 230. In the arm 234 is a rectangular slot 236 for a rectangular block 238 which has lost motion in the slot to avoid cramping. A pivot stud 240 passes through the block into the split arms of a fork 242 where the stud is clamped by screw bolts 244. The fork has a reduced extension 246 rabbeted to and detachably secured by screw bolts 247 to a similar extension on a slide bar 248 which slides horizontally in a recess of the die body 178. Lugs 249 on the slide bar enter elongated recesses in the die body to hold the parts together when the slide bar is detached from the fork 242, as when removing the die bodies to change dies.

At the end of the slide bar 248 are secured bearing blocks 250, each being concave to engage a convex surface on one end of a lever 252. Each lever has a convex surface at the opposite end to engage a concave bearing block 254 which is fixed in a slot of a spring-pressed slide 262. The opposite sides of the levers are convex at the middle and bear against concave surfaces on a bearing block 256 which is part of a slidable die holder 258 for a shearing die 260 which mates with a duplicate die. The levers 252 are in parallel planes but staggered vertically to engage the block 256 on opposite sides of the horizontal center. They equalize the forces applied to the block 256, and the relation of bearing surfaces is such that they double the power. The dies 260 are preferably duplicates of the dies 202. The die holder 258 is slidable within a rectangular spring-pressed slide 262 in which a second die holder 264 for the right hand die is rigidly secured by screws 266. Headed plungers 268 have their heads housed in recesses of the slide 262 and they pass through the die holder 264 to abut against the die holder 258. Coil springs 270 are interposed between the heads of the plungers and adjusting abutment screws 272 threaded in the die body 178. The spring pressed plungers retract the slidable die holder 258 and its die 260 from the opposed die ready to receive the wire W for the shearing operation. A coil spring 274 is interposed between the slide 262 and an adjusting abutment screw 276 to provide a force urging the right hand die towards its mate when shearing and to retract the slide 262 towards a limiting abutment 277 after shearing. The movements of the dies and the slide 262 are illustrated more in detail in Figs. 8, 9 and 10.

As shown in Fig. 8, the gripping dies 202 are closed to grip the wire W tightly on opposite sides for a substantial distance at a location removed from the end. The right hand shearing die 260 lies close alongside one side of the projecting portion of the wire but without any pressure against it while the left hand shearing die 260 is spaced clear of the wire, being so held by the spring pressed plungers 268 acting on the die holder 258. When the first cam rise 224 acts on its cam roller 232, the left hand shearing die 260 is moved to the position shown in Fig. 9 to engage the wire which is still clamped by the dies 202. As this left hand die meets the wire, the resistance of the uncut wire stops the moving die momentarily and causes the levers 252 to react upon the blocks 254 and thus pull the slide 262 to the left whereby the right hand die grips the wire tightly on the opposite side. This grip is a positive one which is proportional to the resistance of the wire to shearing and is a very important feature of the invention. The second cam rise 256 causes both shearing dies 260 with the gripped length of wire to move quickly to the right as a unit to the position shown in Fig. 10, the slide 262 and the die holder 264 moving with the dies against the tension of the springs. This is the completed shearing position wherein shearing occurs along a crescent shaped area C of the sheared slugs S shown in Fig. 11 while fracture occurs over the remaining area A. These areas are quite smooth and flat and substantially in the same plane, the fractured area being almost exactly flat and perpendicular to the axis of the slug.

The two die bodies 176 and 178, in which the dies and the various slides move, lie alongside of one another, being rabbeted together as indicated at 278 in Figs. 5 and 7 and being clamped together as a single unit by bolts 280. This unit is held against endwise movement in an adjusted position by the wedge 210 at one end and by threaded bolts 282 at the other end. Laterally the unit and its side cover plates 182 (see Fig. 7) are held against a shoulder in the frame 40 by side bolts 284 threaded in the frame. The gripping dies 202 are narrower than their die body 176 and to keep them from shifting laterally, fillers 286 are interposed between them and the adjacent cover plates 182. Alongside the shearing dies 260 are fillers 288 which have a flaring opening concentric with the die openings to permit discharge of the work through a frame opening 290 into an inclined chute 292. The die body 178 also has a side cover plate 294 with a flaring opening concentric with that of the filler 288. The sheared slug is pushed out of the machine when the wire is subsequently advanced to bring a new section into the open shearing dies.

Summarizing the entire operation, the wire W is inserted manually in the hole 86 of the feeding head 82 and through the gripping dies 202 as far as the shearing dies, the feed jaws 100 being open. The cam surface 130 and associated mechanism of Fig. 3 then operates the rack and segment to close the jaws on the wire. The feed cam 42 swings the feed lever 46, and the feeding head 82 is shifted axially to advance the wire a definite distance, depending on the position of the feed lever pivot 54, into the shearing dies 260. The cam surface 152 then operates the lever 154 and associated mechanism of Fig. 4 to cause the toggle mechanism to bring the movable gripping die 202 against the wire in opposition to the fixed gripping die. This grips the wire securely substantially all around its periphery. The cam surface 224 operates the mechanism of Fig. 5 to shift the left hand shearing die 260 against the wire to the Fig. 9 position, the resistance of the wire to shearing causing the right hand die to react on the opposite side of the wire to grip it tightly. Then the second cam surface 226 causes both dies to move quickly to the Fig. 10 position to shear and fracture the slug S. Meanwhile the jaws 100 have released the wire and the feed cam has caused the feeding head 82 to shift outwardly ready to commence a new feed stroke. The toggle mechanism of Fig. 4 retracts the left hand gripping die 202, and the spring mechanism of Fig. 5 returns the shearing dies 260 to open position ready to receive the new increment of wire. This advance of the wire, gripping and shearing then continue automatically as long as the machine is supplied with material.

I claim:

1. In a machine of the character described, a pair of gripping dies adapted to grip a length of wire or the like, a pair of shearing dies alongside of the gripping dies, means for closing the shearing dies to grip another length of the wire, and means for shifting the closed shearing dies transversely of the wire for only a portion of the transverse dimension thereof to cut off said other length of wire by combined shear and fracture while the first length remains fixed in its gripped position; substantially as described.

2. In a machine of the character described, means for rigidly gripping a length of wire or the like, a pair of shearing dies, means for closing the dies upon another portion of the wire immediately adjoining the first length, and means for quickly shifting the sharing dies transversely of the wire for only a portion of the transverse dimension thereof to sever the wire by sudden shear and fracture; substantially as described.

3. In a machine of the character described, means for rigidly gripping a length of wire or the like, a pair of mating shearing dies, guide means for one of the dies, means for shifting one of the dies towards its mate to engage another length of the wire, means for causing the resistance of the uncut wire to control a movement of the other die into tight engagement with the wire and means for shifting the closed dies as a unit transversely of the rigidly held length of the wire; substantially as described.

4. In a machine of the character described, means for rigidly gripping a length of wire or the like, a slide, mating shearing dies in the slide, one of the shearing dies being secured to the slide and the other die being movable therein, means for shifting said movable die towards its mate to grip another length of the wire, and means for shifting the slide and the dies as a unit; substantially as described.

5. In a machine of the character described, means for rigidly gripping a length of wire or the like, a slide, mating shearing dies in the slide, one of the shearing dies being secured to the slide and the other die being movable therein, means for urging the movable die away from its mate to provide for entry of the wire between the dies, means for forcing the movable die towards its mate to grip the wire, and means for shifting the slide and the dies as a unit; substantially as described.

6. In a machine of the character described, means for rigidly gripping a length of wire or the like, mating shearing dies, means for urging one of the dies away from its mate to provide for entry of the wire between the dies, means for forcing said one die towards its mate to grip the interposed portion of the wire, means for resisting movement of the mating die until said gripping occurs, and means for overcoming said resistance and shifting both of said dies transversely of the wire; substantially as described.

7. In a machine of the character described, means for rigidly gripping a length of wire or the like, a slide, mating shearing dies in the slide, one of the shearing dies being secured to the slide and the other die being movable therein, means for urging the movable die away from its mate to provide for entry of the wire between the dies, means for moving the movable die towards its mate to grip the interposed wire, means for resisting movement of the mating die and the slide until said gripping occurs, and means for forcing the dies and the slide as a unit transversely of the wire; substantially as described.

8. In a machine of the character described, means for rigidly gripping a length of wire or the like, a slide, mating shearing dies in the slide, one of the dies being secured to the slide and the other die being slidable therein, a spring for urging the slide in a direction transversely of the wire, a spring for urging the slidable die away from its mate, and means acting in opposition to the springs for sliding the slidable die towards its mate and for moving the slide and the dies as a unit; substantially as described.

9. In a machine of the character described, means for feeding a strip of wire or the like in the direction of its length, gripping dies adapted to close on the wire, shearing dies adapted to close on another portion of the wire, a die body for each set of dies, and a wedge for shifting the die bodies transversely of the direction in which the wire is fed; substantially as described.

10. In a machine of the character described, a slide, a guide for the slide, a die shiftable in the slide, a slide bar, and a lever interposed between the slide bar and the slidable die, said lever also having bearing engagement with the slide; substantially as described.

11. In a machine of the character described, a slide, a guide for the slide, a die holder shiftable in the slide, a slide bar, and a lever having rocking engagement at its ends with the slide bar and the slide, another portion of the lever having rocking engagement with the die holder; substantially as described.

12. In a machine of the character described, a pair of mating dies, means for slidably supporting one of the dies for movement towards or from its mate, a slide bar, a pair of parallel levers interposed between the slide bar and the slidable die, and means for shifting the slide bar to force said slidable die towards its mate; substantially as described.

13. In a machine of the character described, a pair of mating dies, means for slidably supporting one of the dies for movement towards or from its mate, a slide bar, means for forcing the slide bar towards the slidable die, and parallel levers interposed between the slidable die and the slide bar, said levers having offset bearing portions on opposite sides of a plane through the center of the dies; substantially as described.

14. In a machine of the character described, a pair of mating dies, means for supporting one of the dies for movement towards or from its mate, a toggle block shiftable towards the dies, a toggle link fulcrumed at one end on the toggle block, and means for forcing the other end of the toggle link transversely of the toggle block; substantially as described.

15. In a machine of the character described, a pair of mating dies, means for supporting one of the dies for movement towards or from its mate, a toggle block guided for movement towards the dies, a toggle slide, a toggle link fulcrumed on the toggle block and on the toggle slide, and means for moving the toggle slide transversely of the toggle block; substantially as described.

16. In a machine of the character described, a pair of mating dies, means for supporting one of the dies for movement towards or from its mate, a pair of toggle blocks, a toggle slide between the toggle blocks, toggle links connecting the toggle slide and the toggle blocks, a shiftable block slidably supporting the toggle slide, and means for shifting the block; substantially as described.

17. In a machine of the character described, shearing mechanism, and means for advancing a strip of material to the shearing mechanism, said means comprising a shiftable head having an opening for the strip in line with the shearing mechanism, clamping means carried by the head to grip the strip, and means for shifting the head towards the shearing mechanism; substantially as described.

18. In a machine of the character described, shearing mechanism, and means for advancing a strip of material to the shearing mechanism, said means comprising a shiftable head having an opening for the strip, clamping jaws movable radially of the opening, a rotary member having cam surfaces to control the jaws, means for turning the member, and means for axially shifting the head; substantially as described.

19. In a machine of the character described, shearing mechanism, and means for advancing a strip of material to the shearing mechanism, said means comprising a shiftable head having an opening for the strip, clamping jaws guided by the head, a rotary member having cam surfaces to control the jaws, a gear segment on the rotary member, a shiftable rack engaging the segment to turn the member, and means for axially shifting the head; substantially as described.

20. In a machine of the character described, shearing mechanism, and means for advancing a strip of material to the shearing mechanism, said means comprising a shiftable head having an opening for the strip, clamping jaws movable radially of the head and each having a roller, springs for urging the jaws apart, a rotary member having cam surfaces engaging the rollers, means for turning the member to cause the jaws to grip the strip, and means for axially shifting the head to advance the strip to the shearing mechanism; substantially as described.

21. The method of shearing a slug from a strip of wire or the like, which consists in tightly gripping a length of the strip on opposite sides, gripping another length of the strip on opposite sides and in immediate adjacence to the first length, and moving one of said gripped lengths transversely of the other for a distance less than the transverse dimension of the strip to sever the wire by shearing and fracture; substantially as described.

22. The method of shearing strip material, which consists in gripping a length of the strip away from the end portion, moving a shearing die against the end portion, and causing the resistance of the strip to shearing to control the pressure of a second die in opposition to the first; substantially as described.

23. The method of shearing strip material, which consists in gripping one length of the strip, moving a shearing die transversely against another length of the strip, and utilizing the resistance of the strip to shearing to control a proportional pressure of a second die in opposition to the first; substantially as described.

24. The method of shearing strip material, which consists in gripping one length of the strip, moving a shearing die against another length of the strip, utilizing the resistance of the strip to shearing to control a proportional pressure of a second die in opposition to the first, and maintaining said pressure proportional to the resistance while moving the dies as a unit crosswise of the strip to sever it; substantially as described.

25. In a machine of the character described, means for gripping a length of wire or the like, a pair of opposed shearing dies, means for shifting one of the shearing dies towards its mate to engage another length of the wire adjoining the first length, means for causing the resistance of the unsevered wire to produce a reaction for forcing the other shearing die into gripping engagement with said other length of wire, and means for causing both dies to move thereafter as a unit transversely of the rigidly held length of wire to cut off said other length by combined shear and fracture; substantially as described.

26. In a machine of the character described, means for gripping a length of wire or the like, a pair of opposed shearing dies to grip opposite sides of another length of the wire, power operated mechanism for moving the shearing dies transversely of the wire to shear off said other length, said mechanism comprising means operable during said shearing operation for causing the shearing dies to grip said other length of wire with a force which is proportional to the resistance of the wire to shearing; substantially as described.

27. In a machine of the character described, means for gripping a length of wire or the like, a pair of opposed shearing dies to grip opposite sides of another length of the wire, power operated mechanism for moving the shearing dies transversely of the wire, said mechanism comprising a lever connection between the shearing dies for causing the latter to grip said other length of wire between them with a force which is proportional to the resistance of the wire to shearing; substantially as described.

28. In a machine of the character described, means for gripping a length of wire or the like, a pair of opposed shearing dies to grip opposite sides of another length of the wire, power operated mechanism for moving the shearing dies transversely of the wire, and means operable during the transverse movement for causing the resistance of the unsevered wire against one die to produce a pressure reaction of the other die against the wire with a force that is proportional to said resistance; substantially as described.

29. In a machine of the character described, a pair of opposed shearing dies, power operated means to force one of the dies against the material to be sheared, said power operated mechanism comprising means for causing the opposed die to react upon the opposite side of the material with a force that is proportional to the resistance of the material; substantially as described.

30. In a machine of the character described, a pair of mating shearing dies adapted to engage opposite sides of the work, means for moving one of the dies against one side of the work, a carrier for the other die, means for causing the resistance of the work against said one die to react on the carrier to force the other die against the opposite side of the work, and means for moving the closed dies as a unit to shear the work while maintaining the pressure of the other die proportional to the resistance to shearing; substantially as described.

ALBERT VUILLEUMIER.